(12) United States Patent
Cassel et al.

(10) Patent No.: US 7,832,776 B2
(45) Date of Patent: Nov. 16, 2010

(54) PIPE CLAMP WITH INTEGRAL LATCH

(75) Inventors: Scott T. Cassel, Bloomfield Hills, MI (US); Michael E. Amedure, Lake Orion, MI (US); Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 12/325,701

(22) Filed: Dec. 1, 2008

(65) Prior Publication Data

US 2009/0079189 A1    Mar. 26, 2009

Related U.S. Application Data

(63) Continuation of application No. 10/983,394, filed on Nov. 8, 2004, now Pat. No. 7,458,619.

(60) Provisional application No. 60/518,133, filed on Nov. 7, 2003.

(51) Int. Cl.
    *F16L 25/00*    (2006.01)
(52) U.S. Cl. .................. 285/420; 285/7; 285/23; 285/252; 24/279; 24/284
(58) Field of Classification Search .............. 285/7, 285/23, 252–253, 305, 420, 311; 24/279, 24/284
    See application file for complete search history.

(56) References Cited

U.S. PATENT DOCUMENTS

| 909,131 | A | | 6/1909 | Antic |
|---|---|---|---|---|
| 941,204 | A | | 11/1909 | Pittman |
| 1,000,992 | A | * | 8/1911 | Cooper .................. 24/286 |
| 1,278,598 | A | | 9/1918 | Cooper |
| 1,369,162 | A | * | 2/1921 | Boone .................... 285/8 |
| 1,601,612 | A | * | 9/1926 | Edwards .................. 248/66 |
| 1,901,897 | A | | 3/1931 | Clayton |
| 2,052,046 | A | | 8/1936 | Lambie |
| 2,687,905 | A | | 7/1952 | Jacobs |
| 2,692,781 | A | | 10/1954 | Langille |
| 3,004,781 | A | | 10/1961 | Morris |

(Continued)

FOREIGN PATENT DOCUMENTS

WO    WO0031456 A1    6/2000

OTHER PUBLICATIONS

Supplementary European Search Report for EP 04810577.9, Mar. 8, 2010, 3 pages.

(Continued)

*Primary Examiner*—Aaron Dunwoody
*Assistant Examiner*—Fannie Kee
(74) *Attorney, Agent, or Firm*—Reising Ethington P.C.

(57)    ABSTRACT

A pipe clamp that enables two pipes to be loosely connected together in a desired axially-aligned and rotationally-aligned configuration prior to tightening of the clamp. The pipe clamp includes a band having a first end and a second end, and a tightening mechanism connected to the band for drawing the ends of the band together. The pipe clamp further includes a latch having a base portion attached to the band and a clip portion that snaps over a button welded to the pipe to temporarily hold the clamp in place on the pipe.

16 Claims, 6 Drawing Sheets

U.S. PATENT DOCUMENTS

| | | | |
|---|---|---|---|
| 3,178,208 A | 4/1965 | Koehler | |
| 3,245,698 A | 4/1966 | Fromknecht | |
| 3,327,945 A | 6/1967 | Pfister | |
| 3,365,218 A | 1/1968 | Denyes | |
| 3,389,442 A | 6/1968 | Tetzlaff | |
| 3,407,448 A | 10/1968 | Tetzlaff et al. | |
| 3,477,106 A | 11/1969 | Tetzlaff et al. | |
| 3,565,468 A | 2/1971 | Garrett | |
| 4,155,574 A | 5/1979 | Hulsey | |
| 4,312,526 A | 1/1982 | Cassel | |
| 4,365,393 A | 12/1982 | Hauffe et al. | |
| 4,372,017 A | 2/1983 | Heckethorn | |
| 4,629,226 A | 12/1986 | Cassel et al. | |
| 4,643,465 A | 2/1987 | Green et al. | |
| 4,813,720 A | 3/1989 | Cassel | |
| 5,026,096 A | 6/1991 | Lutz, II | |
| 5,588,680 A | 12/1996 | Cassel et al. | |
| 6,089,624 A | 7/2000 | Cassel et al. | |
| 6,269,524 B1 | 8/2001 | Cassel | |
| 6,519,815 B2 | 2/2003 | Cassel et al. | |
| 6,557,908 B2 | 5/2003 | Houtschilt et al. | |
| 6,832,786 B2 | 12/2004 | Duncan et al. | |
| 6,942,253 B2 | 9/2005 | Bowater | |
| 7,320,486 B2 | 1/2008 | Geppert | |
| 7,458,619 B2 | 12/2008 | Cassel et al. | |
| 2002/0014772 A1 | 2/2002 | Amedure et al. | |
| 2003/0071462 A1 | 4/2003 | Duncan et al. | |

OTHER PUBLICATIONS

Examiner's First Search Report (Australia), for patent application No. 2004289698, 3 pages.

* cited by examiner

PIPE CLAMP WITH INTEGRAL LATCH

CROSS-REFERENCE TO RELATED APPLICATION

This application is a continuation of U.S. application Ser. No. 10/983,394 filed Nov. 8, 2004, now U.S. Pat. No. 7,458,619, which claims the priority of U.S. Provisional Patent Application No. 60/518,133, filed Nov. 7, 2003. The complete disclosures of these two applications are hereby incorporated by reference.

TECHNICAL FIELD

This invention relates to pipe clamps for securing pipes together and to techniques for loosely securing a pipe clamp to pipe ends in a desired configuration prior to tightening of the clamp.

BACKGROUND OF THE INVENTION

Automotive exhaust pipes are typically routed along the underbody of a vehicle and may take winding paths between the exhaust manifold, catalytic converter, and muffler depending upon the design and location of other components of the vehicle. In order to avoid obstructions and for underbody packaging purposes, it is often necessary for the exhaust pipe to include one or more bends along its length. Such exhaust pipes can be manufactured in separate sections between at least some of the bends, positioned in an end-to-end axial configuration, and then connected together by a pipe clamp to form an assembled exhaust pipe. In an automotive assembly plant, the first step of this process may be performed while a vehicle is actually flipped upside down, giving an operator access to the underbody. The pipe clamps are typically not tightened until the vehicle is again flipped right side up. As a result, it is not unusual for the loosely-connected exhaust pipe ends and pipe clamps to dislodge when the vehicle is flipped back to its normal orientation. When this happens, the assembly process is disrupted and consequently becomes less efficient.

In such applications, the pipes are usually positioned and connected together either as a lap joint, with the pipe ends telescopically overlapping each other, or as a butt joint, with the pipe end edges abutting each other. For lap joints, a band clamp is commonly used to clamp the two pipe ends together and is attached over the outer pipe at a location where the two pipes overlap. For butt joints, a pipe coupler is normally used which spans the juncture of the two abutting pipe ends and includes a clamping mechanism that permits it to be securely clamped over both of the two ends. As used throughout this patent, the term "pipe clamp" includes band clamps, pipe couplers, and the like.

In both lap joints and butt joints a tight seal is important and partly dependent upon pipe end positioning. In lap joints, if the pipe ends are overlapped too far, the excess pipe material becomes waste. Conversely, if the pipe ends are not overlapped far enough, an adequate seal may not be provided. For butt joints, an inadequate seal will result if the pipe end edges are not positioned to properly abut each other.

Thus, it is an object of the present invention to provide a pipe clamp that can be used to provide an initial interconnection of two pipe ends together in a desired configuration prior to tightening of the clamp.

SUMMARY OF THE INVENTION

In accordance with one aspect of the present invention, a pipe clamp is provided for securing a first pipe to a second pipe wherein one or both of the pipes include an interlocking feature. The pipe clamp includes a band having a first end and a second end, and a tightening mechanism connected to the band for drawing the ends of the band together. The pipe clamp further includes a latch having a base portion attached to the band, and having a clip portion with an interlocking feature adapted to engage the interlocking feature of the pipe(s) as the pipes are assembled together.

According to a preferred exemplary embodiment, the present invention may be utilized in the form of a band clamp attached to a first pipe that telescopically fits over a second pipe having a button or other interlocking feature that connects to the clip portion of the latch as the two pipes are assembled together. The clip can connect to and retain the interlocking feature of the second pipe either itself or in conjunction with a notch formed in the end of either the first pipe or the band clamp. The band clamp can be secured to the first pipe by a weld or by another clip/button connection. The latch may also be rotatably mounted to the band.

According to another preferred exemplary embodiment, the present invention may be utilized in the form of a pipe coupler wherein the pipes are connected together by the clamp with their ends abutted together. The interlocking feature can be provided on one or both pipes and one or both axial ends of the pipe coupler. Where the pipe coupler is configured to be loosely attached to both pipe ends via interlocking features, a single latch having a clip at each opposite end can be used. The clips can extend past the end of the pipe coupler to engage the buttons or other interlocking features on the pipes. Alternatively, the pipe coupler can have a notch at one or both axial ends to receive the buttons, with the clips being substantially flush with the axial ends to minimize the possibility of damage to the clips during shipping and handling. Where the pipe coupler includes a split sealing sleeve, the sleeve can also be notched at the same location(s) as the outer band of the coupler.

In any of the embodiments, the interlocking feature of each clip preferably, but need not, includes at least one slanted or up-turned edge forming a bearing surface that allows the clip to ride up over the button or other interlocking feature of the pipe as they are assembled. Where a notch in the clamp or pipe is used, the clip can include a single up-turned edge to enable axial assembly of the button under the clip and into the notch. Where the button can potentially be inserted into the clip from both an axial direction and from an angular direction by relative rotation of the two components, the up-turned edges of the clip can extend at least partially around the clip to facilitate this multi-directional assembly of the two components.

In use, the pipes are assembled together within the pipe clamp such that its clip snaps over the button or other interlocking feature of the pipe to loosely connect the two pipes together. The allows the manufacturer to preset the correct axial and angular alignment of the two pipes which then helps minimize the errors that occur during assembly. This also facilitates assembly for the installer doing the work since the two pipes are loosely connected together via the clamp and the installer is therefore free to tighten the clamp without having to simultaneously hold the pipes together to prevent undesired relative axial or angular movement.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
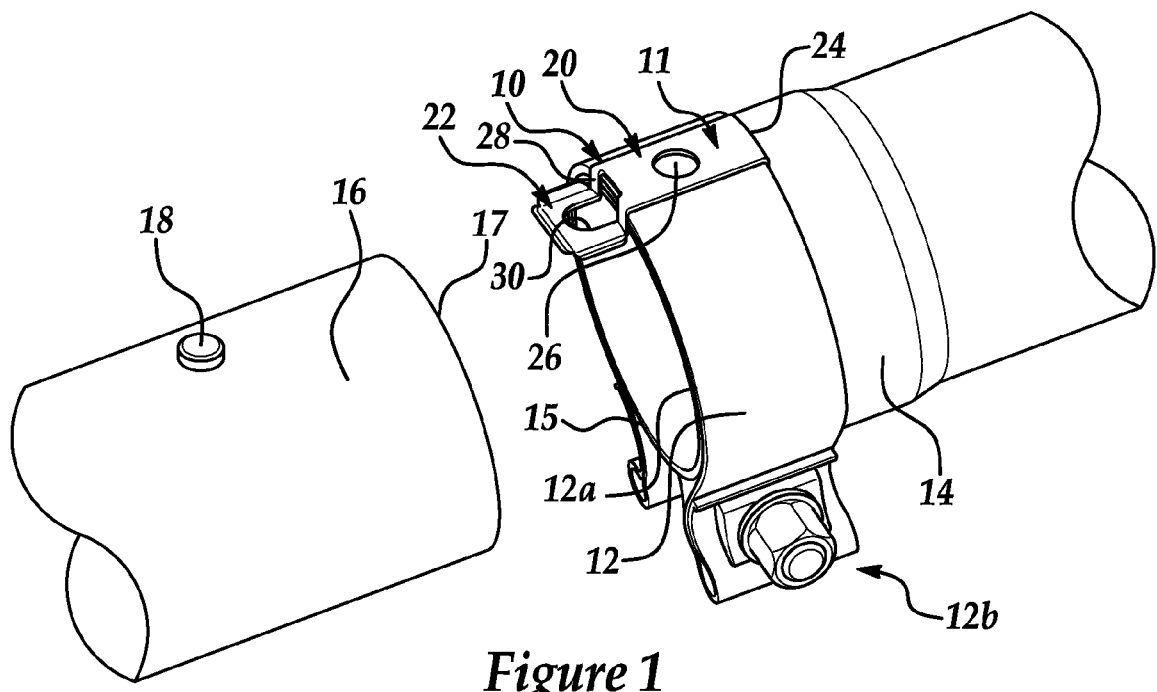
FIG. 1 is a perspective view of a first embodiment of a pipe clamp of the present invention prior to coupling of two exhaust pipe ends via the pipe clamp.

Referring now to the drawings, there is shown five illustrative embodiments of a pipe clamp that utilizes an integral latch along with a button on one or both of a pair of pipe ends to temporarily secure the pipe ends together prior to tightening of the pipe clamp. These embodiments will be described with reference to their use in an automotive exhaust system. However, it will be appreciated as the description proceeds that the invention is useful in many different applications and may be implemented in many other embodiments. In this regard, and as used herein and in the claims, it will be understood that the term "pipe" refers not only to automotive exhaust pipes and connecting stubs on exhaust system components, but also to other tubular members of circular or other cross-sectional shape, regardless of whether they are used to carry fluid, and regardless of whether they are made of metal, plastic, or some composite or other material.

Figure 2:
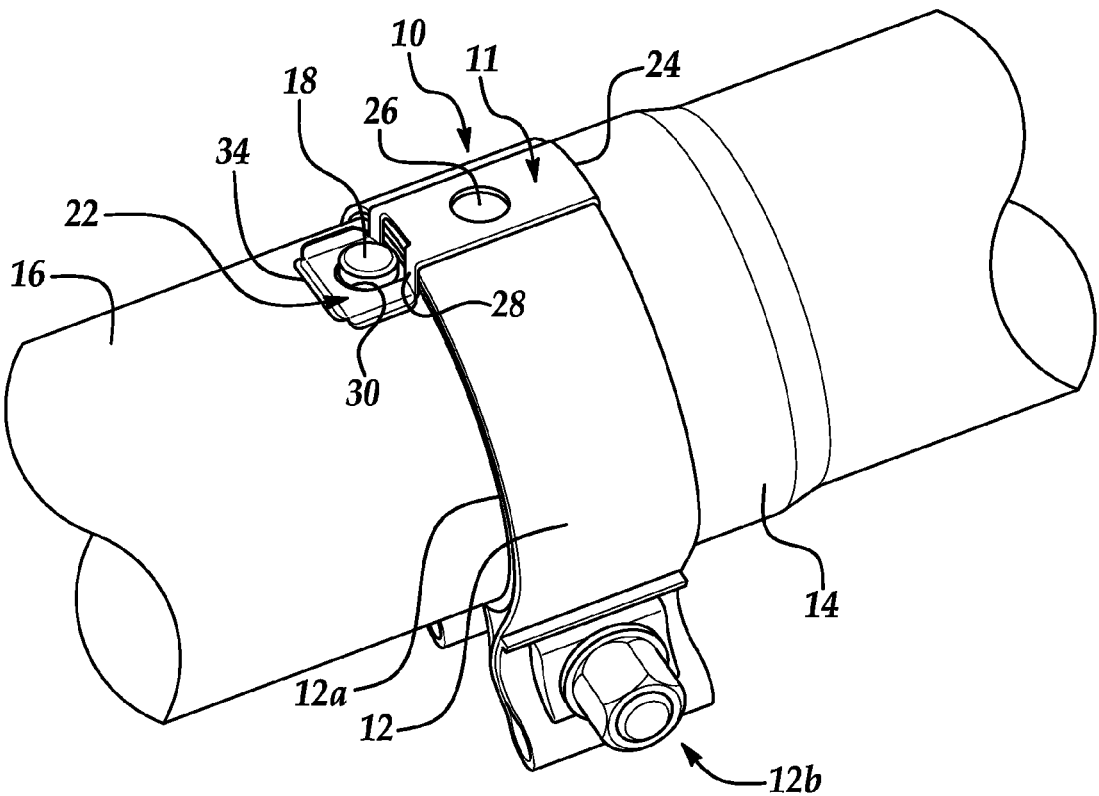
FIG. 2 is a perspective view showing the pipe clamp of FIG. 1 after the two exhaust pipe ends are positioned and initially interconnected via a button on the one pipe and a latch on the pipe clamp.
Figure 3:
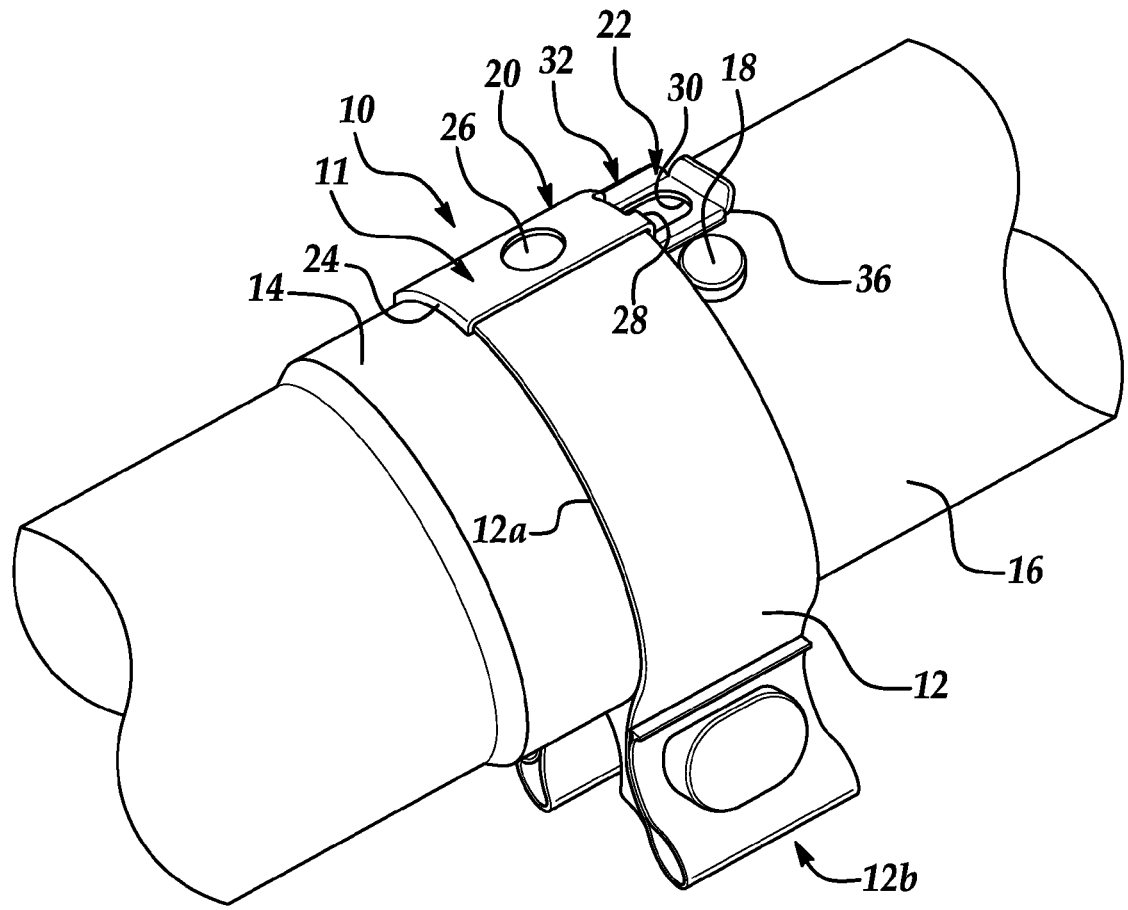
FIG. 3 is a perspective view showing how the latch on the pipe clamp of FIG. 1 can snap over the button from a side direction.

FIG. 1 shows a band clamp 12 and its integral latch 10 in accordance with a first embodiment of the present invention. Latch 10 is shown secured to band clamp 12 which can be done as a part of original manufacturing of the band clamp 12 prior to its use. Clamp 12 with its latch 10 is securely attached by, for example, a spot weld, to an end of a first exhaust pipe 14, and the latch 10 is used to temporarily secure the band clamp 12 and attach first pipe 14 to a second exhaust pipe 16 in a desired configuration by snapping over a button 18 that is pre-formed or pre-attached to the second pipe 16, as shown in FIG. 2. This temporary connection properly locates the two pipe ends together and allows clamp 12 to be subsequently tightened without the installer or a second person having to separately hold the pipe ends together during tightening. As shown in FIGS. 1-3, button 18 is a cylindrical protrusion located on the outer surface of pipe 16; however, as used herein and in the claims, "button" refers broadly to any engageable protrusion of any shape extending upwardly from the surface of the pipe. The button 18 comprises an interlocking feature of the pipe used to connect it to the clamp, and it will be understood that other types of interlocking features can be used in lieu of or in addition to a button to connect the pipe clamp 12 to one or more of the pipes 14, 16.

Again referring to FIG. 1, latch 10 secures ends 15 and 17 of first exhaust pipe 14 and second exhaust pipe 16, respectively, together. First exhaust pipe 14 and second exhaust pipe 16 have the same diameter, except that pipe 14 has a radially expanded section at its end 15 to allow pipe 16 to telescopically overlap pipe end 15. This lap joint is shown in FIG. 2. Both pipes are primarily made of iron, but can be made of any suitable material for the particular application involved. Exhaust pipes generally have a circular cross-section but, as noted above, clamp 12 can be used with clamps and pipes of various cross-sections and sizes.

With the exception of latch 10, clamp 12 can be made as described in U.S. Pat. No. 4,312,526, U.S. Pat. No. 6,269,524, or U.S. Pat. No. 6,519,815. The entire disclosures of these patents are hereby incorporated by reference. As discussed in these patents, a pipe clamp in general includes a band or sleeve with confronting circumferential ends or end portions that can be drawn together by a tightening mechanism to tighten the band around pipe ends. The tightening mechanism includes a fastener such as a bolt and nut to effect the tightening, and can, but need not, include a spline between the confronting circumferential ends, as shown in these patents. A SealSlot™ sealing end configuration can be used as disclosed in U.S. Pat. Nos. 4,629,226, 5,588,680, and 6,089,624, and the entire disclosures of these patents are hereby incorporated by reference.

Figure 4:
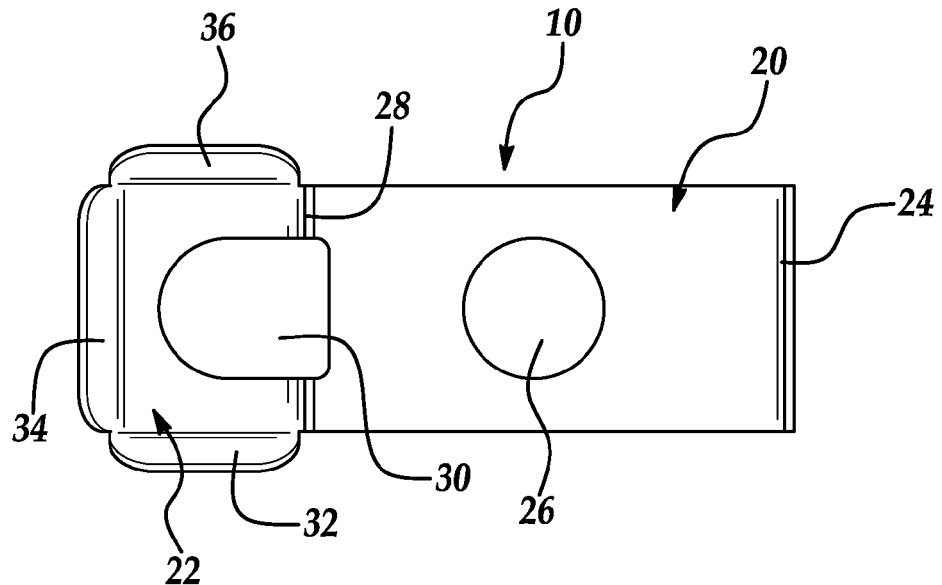
FIG. 4 is a top view of the latch of FIG. 1.

Referring now to FIG. 4, latch 10 is stamped from a unitary piece of stainless steel or other suitable sheet metal and formed to include a base portion 20 and a clip 22 that are offset from each other by a step 28. Also referring to FIGS. 1 and 2, base 20 overlaps the outer surface of clamp 12 and is generally rectangular in shape. Base 20 includes a flange 24 and an aperture 26. Flange 24 is located at an opposite end from step 28 and rests against a side edge of clamp 12 during use. The distance between flange 24 and step 28 is approximately equal to the axial width of clamp 12. Aperture 26 is circular and centrally located in base 20. Its function will be described later with FIGS. 1-3 but it should be noted here that aperture 26, if used at all, can be of various shapes, sizes, and locations on base 20. Clip 22 is adapted to catch button 18 in a snap-fit orientation and is rectangular in shape. Clip 22 includes an interlocking feature in the form of a central aperture or opening 30, and clip 22 further includes three slanted or up-turned edges 32, 34, and 36. Opening 30 is an aperture in clip 22 that extends through the stepped portion 28. Opening 30 is shaped to snap over and accommodate button 18 which is securely affixed to second exhaust pipe 16 to act as an anchor for latch 10 once engaged. This is shown in FIG. 2. Button 18 has a short, solid cylindrical shape. It should also be noted that opening 30 could be of various shapes and sizes, and likewise that button 18 could be of various shapes and sizes to fit within opening 30. The first and third up-turned edges 32 and 36 are congruent, being rectangular in shape with rounded outer corners. Second edge 34 is similar but with a greater length. First and third edges 32, 36 are located on opposite sides of opening 30 and second edge 34 is located opposite the step 28.

The three up-turned edges 32, 34, 36 of clip 22 permits multi-directional engagement of button 18. More specifically, the up-turned edges each define a bearing surface on the bottom side of the inclined edge portion, and it is this bearing surface that enables the clip 22 to flex upwardly when the bearing surface engages the button 18 so that the clip 22 can be snapped over the button 18. By providing the up-turned edges 32, 34, 36 all of the way around the central portion (except at the step 28), the latch 10 can be snapped over the button 18 by either relative axial movement of the two pipe ends or by relative rotational movement about their common axis, or by some combination of both.

Figure 5:
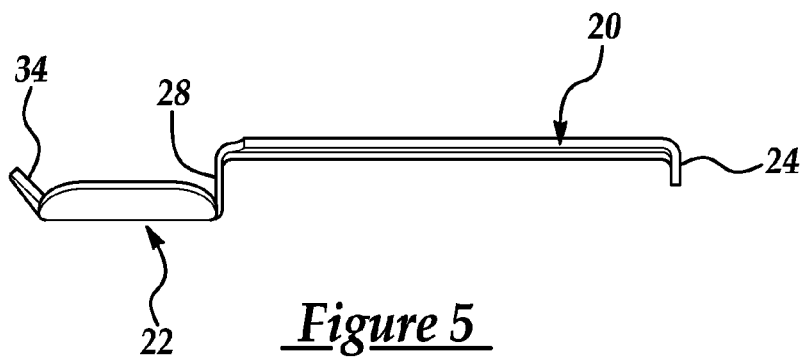
FIG. 5 is a side view of the latch of FIG. 1.

Referring to FIG. 5, flange 24 is perpendicular to base 20 and extends to a distance approximately equal to the thickness of clamp 12. Opposite flange 24 is the step 28 which provides a vertical distance between base 20 and clip 22 so that clip 22 can rest on the outer surface of the second pipe 16. This vertical distance is equal to the thickness of a band 12a of the clamp 12 plus the thickness of the pipe wall; however, it will be appreciated that this vertical offset can be more or less and, for some applications, step 28 need not be used at all. As described earlier, the distance between flange 24 and step 28 is approximately equal to the axial width of clamp 12 so that, in use, step 28 will also rest on an opposite longitudinal edge of clamp 12. In this view, the up-turned edge 34 forms an internal acute angle of roughly 45° with horizontal clip 22. Although not shown here, a similar side view of first and third up-turned edges 32, 36 would reveal the same angle.

Referring back to FIGS. 1-3, during manufacturing of clamp 12, latch 10 is positioned on the band 12a with the flange 24 and step 28 engaging opposite longitudinal edges of the band 12a. At the same time, it is located circumferentially on the band 12a in a position that is offset from a tightening mechanism 12b. This offset, if used, need not be at the location shown, but can be at other locations on the band 12a. Latch 10 is spot-welded onto the band 12a in a welding area 11. Welding area 11 is located opposite clip 22 on base 20 to facilitate vertical flexibility of clip 22. Once the clamp 12 and latch 10 are manufactured and secured together, clamp 12 is slid over pipe 14 so step 28 is flush with the end 15. In this position, clamp 12 is spot-welded onto pipe 14. Aperture 26 provides a welding area without welding latch 10 to clamp 12 again. Clamp 12 can be welded at locations other than the spot at which the latch 10 is attached to the band 12a. For pipe 16, button 18 is spot-welded at an optimal distance from end 17 so that the two pipes will be positioned appropriately for the particular application. In this case lap joints are being formed so button 18 is spot-welded at a distance on pipe 16 to provide a pipe overlap. For a butt joint, button 18 would be spot-welded at a distance so ends 15 and 17 are abutted. Also, the button 18 can be positioned at a proper circumferential position on the pipe 16 so that the two pipes 14, 16 will be properly aligned rotationally, which can be important where the pipes 14, 16 include bends or otherwise need to be placed in a particular rotational orientation.

During assembly of the two pipes 14, 16, they are first aligned axially. As shown in FIG. 2, first exhaust pipe 14 overlaps second exhaust pipe 16. Clip 22 slides over and onto the outer surface of second exhaust pipe 16 until it engages button 18. As clip 22 and button 18 meet from a generally straight-on or axial direction, the up-turned edge 34 and the vertical flexibility of the latch 10 allow clip 22 to slide over button 18 until button 18 catches on the arcuate edge defining opening 30. This will also occur if clip 22 and button 18 meet from a generally side or circumferential direction, as shown in FIG. 3, either by the first inclined edge 32 or the third inclined edge 36. Once button 18 is fully snapped into opening 30, the bottom surface of clip 22 is generally flush with the outer surface of second exhaust pipe 16 and held taut by the intrinsic resiliency of the latch material, thereby preventing disengagement. The two pipes 14, 16 are now secured and properly positioned so that clamp 12 can be tightened to seal the two pipe ends (not shown) together, and this can be done without having to manually hold the two pipe ends together in the proper position during tightening. To separate the two pipes 14, 16, the band clamp 12 can be loosened, and the latch 10 can be manually disengaged by simply flexing the clip 22 back upwards and off the button 18.

Figure 6:
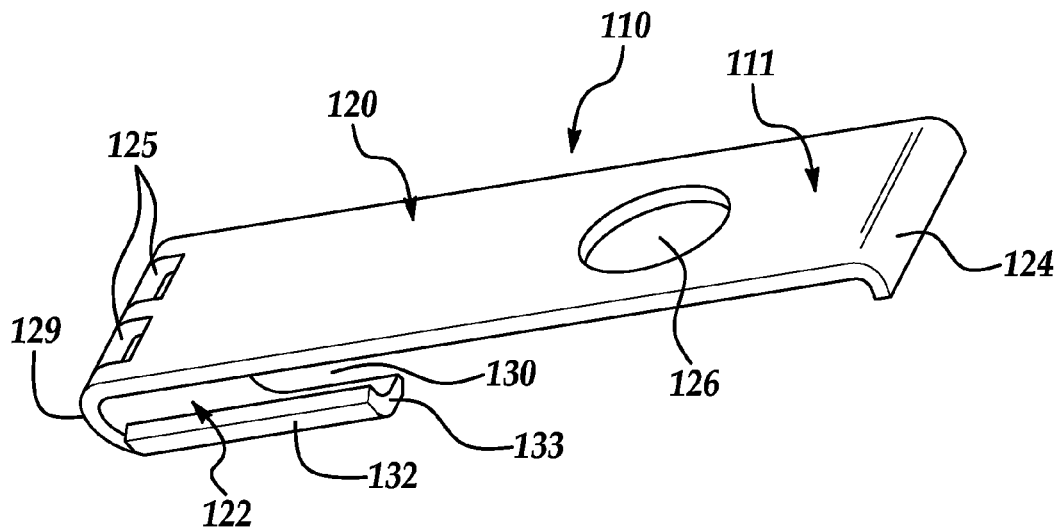
FIG. 6 is a perspective view of an alternative embodiment of the latch for the pipe clamp of FIG. 1.

FIG. 6 shows an alternative embodiment 110 of the latch. With additional reference to FIGS. 1 and 2, this embodiment is similar to the latch 10 of the first embodiment and performs a similar function with a few modifications. As can be seen, a base 120 is longer in this embodiment though the width remains the same. A clip 122 is also modified. An interlocking or retention feature 130 is shaped similarly to opening 30 of the first embodiment latch 10 for the purpose of engaging button 18, but is open on one side to form a U-shaped recess in the clip 122. A pair of opposing slanted or up-turned edges (only one up-turned edge 132 is shown) are located at the opposite sides of clip 122 to engage button 18 from a side or circumferential direction. Instead of vertical step 28, latch 110 has base 120 and clip 122 set apart by a bend 129 wherein the steel material of the latch 110 is turned back on itself. Bend 129 is located at an end of base 120 and inverts clip 122 underneath base 120. This bend 129 can have an angled bearing surface, similar to that formed by the up-turned edge 132, to permit the latch 110 to slide up on and over the button 18 during straight-on or axial assembly of the two pipes 14, 16. In this embodiment, the distance between an end edge 133 on clip 122 and a flange 124 is set to be slightly greater than the width of the clamp with which it is used. In this way, the button 18 will be captured between the interlocking feature 130 and the longitudinal edge of the band clamp. To reduce stress and ease bending during manufacturing, apertures 125 are located where the bend 129 begins.

Similar to the first embodiment, latch 110 is stamped from a unitary piece of sheet metal and is generally rectangular in shape. Base 120 includes flange 124 and an aperture 126 that are similarly configured and function as described in the first embodiment. Bend 129 provides a vertical distance between base 120 and clip 122 that is similar to the offset of the step 28 of the first embodiment.

During manufacturing, the base 120 of the clip 110 is first spot-welded onto the clamp in a welding area 111. The clamp is then slid over the end 15 of the pipe 14 so edge 133 contacts this end 15. The clamp is again spot-welded onto pipe 14 through aperture 126. Button 18 is spot-welded at the same distance as before. These steps can be carried as a part of forming the band clamp and pipes 14, 16. Then, during assembly by an installer, the exhaust pipe sections are positioned and rotated as necessary so that retainer 130 catches button 18 from either a straight-on (axial) or side (circumferential) direction.

Figure 7:
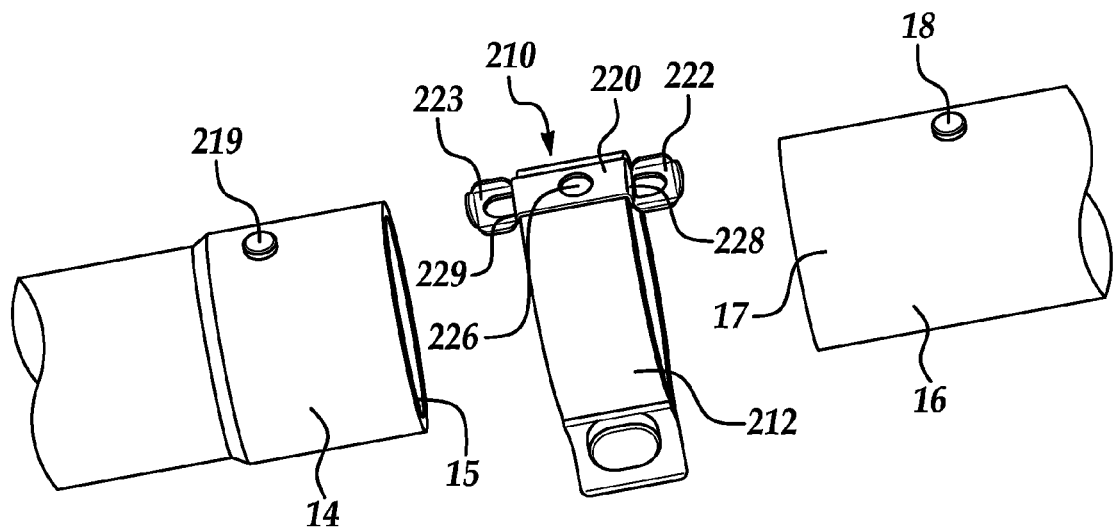
FIG. 7 is a perspective view of a second embodiment of the pipe clamp of the present invention that uses a two ended latch which engages a button on each of the two exhaust pipe ends.
Figure 8:
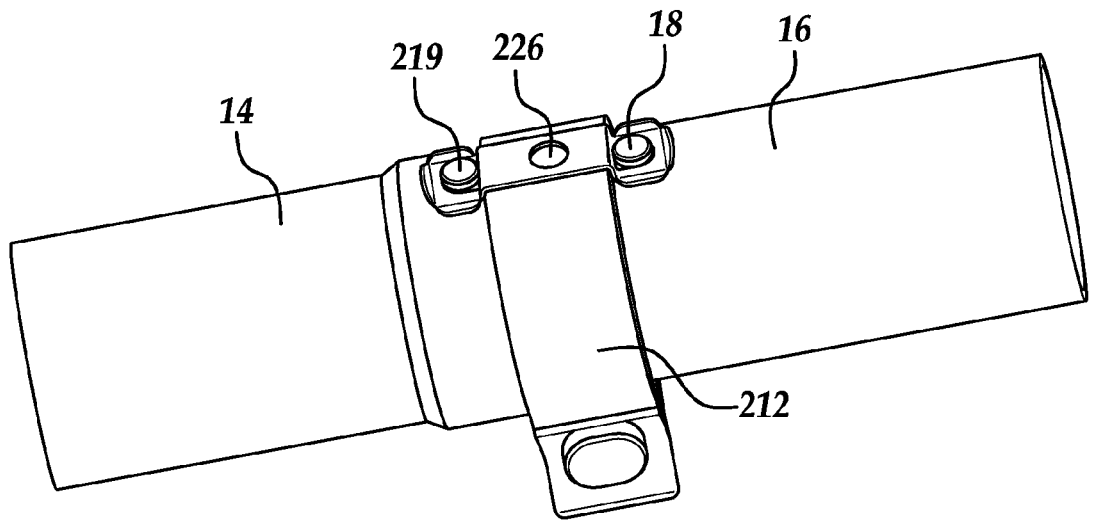
FIG. 8 is a perspective view showing the pipe clamp of FIG. 7 after the two exhaust pipe ends are telescoped together and the latch fully engaged with the two buttons.

FIGS. 7 and 8 show a second embodiment of the present invention in the form of a band clamp 212 that is similar to that of FIGS. 1-5 in that it includes a base 220 and clip 222. However, instead of flange 24, the latch 210 includes a second clip 223 attached to the base 220 opposite the first clip 222.

The first clip is attached to base 220 at a first step 228 as in the first embodiment, and the second clip 223 is attached to the base by a second step 229. Second step 229 is shorter than first step 228 so that the second clip 223 can rest on the outer surface of pipe 14. In this embodiment, the distance between the first and second steps 228, 229 is slightly greater than the width of the band. Also, a second button 219 is spot-welded or otherwise formed onto pipe 14 at a location spaced axially from the end 15 for engagement with second clip 223. This sets the proper positioning of clamp 212 over the two pipes 14, 16, as well as the proper axial and rotational alignment of the pipes relative to each other. If desired, clamp 212 can be welded to pipe 14, although it will be appreciated that this second clip 223 and button 219 eliminates the need for welding or otherwise separately attaching clamp 212 to the pipe.

Similar to the first embodiment, latch 210 is stamped from a unitary piece of sheet metal and is generally rectangular in shape. Also, base 220 includes an aperture 226. Clip 222 can be identical to clip 22, as described in the first embodiment, and second clip 223 can simply be a mirror image of clip 222.

During use, latch 210 performs a similar function as described in the first embodiment. Here, a welding area, if used at all, could be located on either or both sides of aperture 226, possibly making one clip 222 or 223 more vertically flexible than the other, but still allowing the other clip enough flexibility to slide over and catch its respective button.

Figure 9:
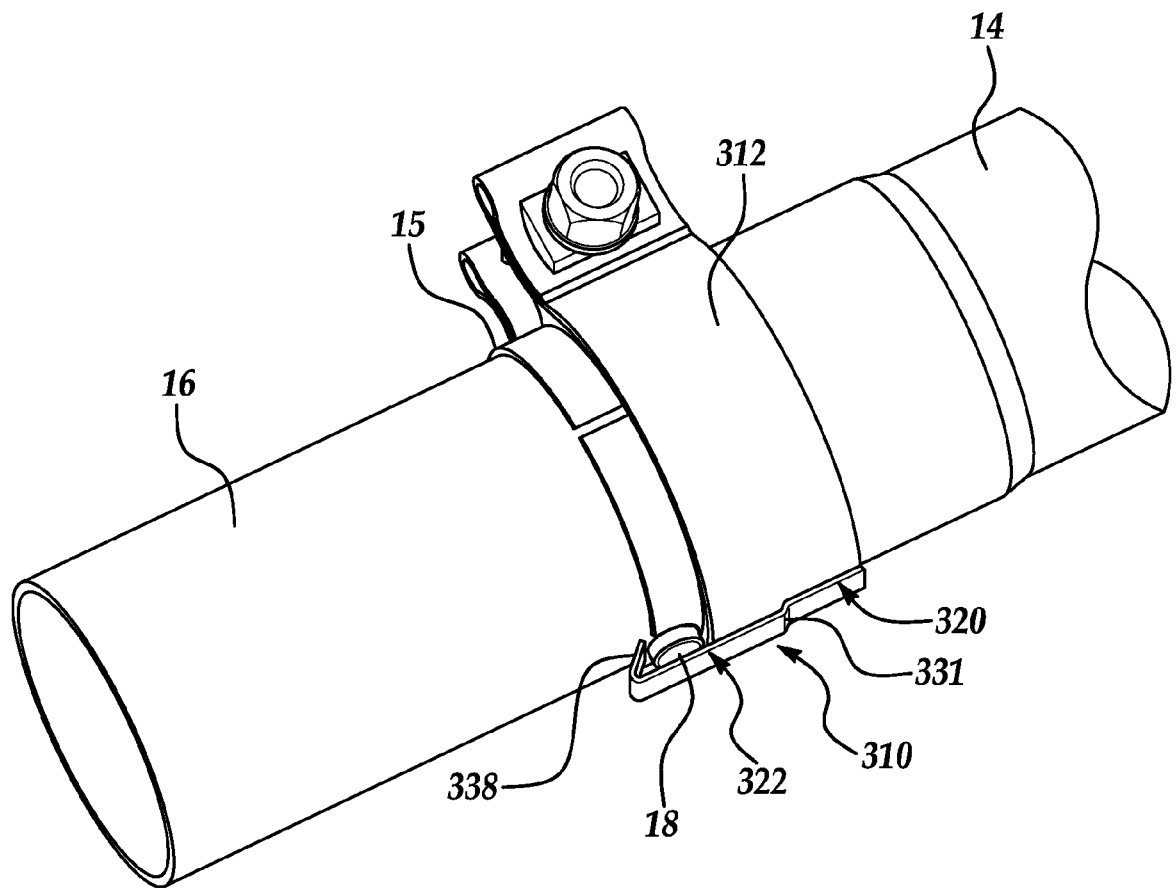
FIG. 9 is a perspective view of a third embodiment of the pipe clamp of the present invention.
Figure 10:
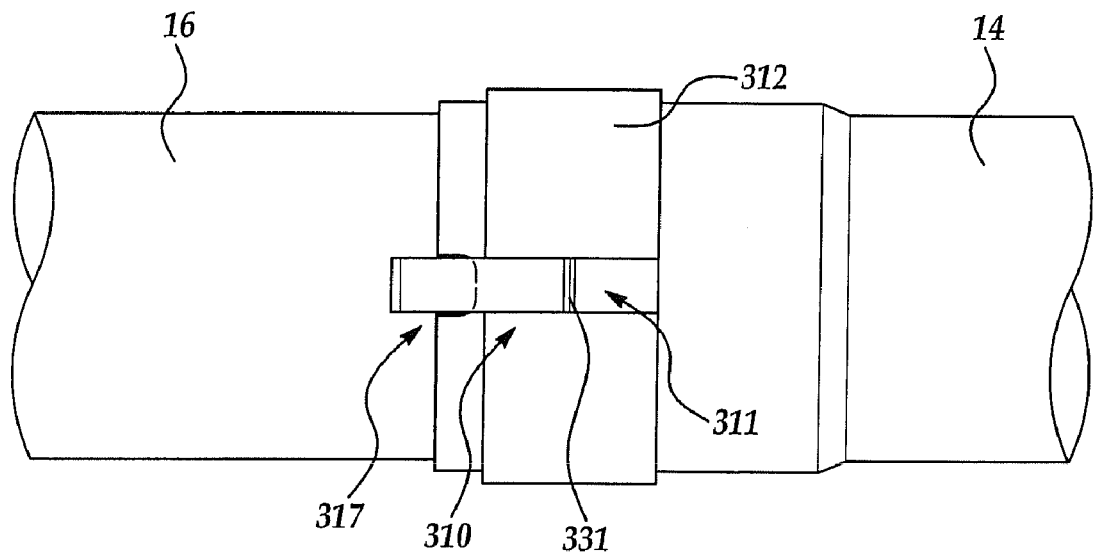
FIG. 10 is a side view of the pipe clamp shown in FIG. 9.

FIGS. 9 and 10 show a third embodiment of the present invention in the form of a band clamp 312 having a latch 310 that includes a base 320 and a clip 322 set apart vertically by a step 331. Clip 322 includes an interlocking feature or retention finger 338. Finger 338 snaps over and catches on button 18. Finger 338 is located at an opposite end of the latch 310 from base 320 and is inverted underneath the remainder of clip 322 and slanted at an approximate 45° angle with horizontal clip 322. Step 331 simply facilitates vertical flexibility of clip 322, and need not be necessary. Similar to the first embodiment, latch 310 is stamped from a unitary piece of sheet metal and is generally rectangular in shape. The latch 310 can be welded to the band of the clamp 312 at a welding area 311, and the band clamp 312 can then be itself welded to the pipe 14.

Apart from the use of finger 338, clamp 312 differs from the first embodiment in that it is not attached to the pipe 14 flush with the end 15 of the pipe 14, but is inset axially by a short distance to accommodate a U-shaped recess or notch 317 in the end 15 of pipe 14. This notch 317 is sized to receive the button 18 of the second pipe 16 to axially and rotationally align and retain the two pipes 14, 16. The finger 338 then is used to hold the button 18 in the notch 317 during tightening of clamp 312. Thus, the pipe notch 317 fixes the relative rotational position of the two pipes 14, 16, while the finger 338 fixes and holds the two pipes 14, 16 together axially. For this embodiment, when welding clamp 312 to the pipe 14, the band clamp 312 is located on the pipe 14 so that the clip 322 extends over and past notch 317 with the end edge of the finger 338 being located almost flush with the end 15 of the pipe 14, leaving enough room to accommodate the button 18 between the end of finger 338 and notch 317 in pipe end 15. By keeping the finger 338 from extending past the end 15 of the pipe 14, this arrangement helps protect the latch 310 from damage during shipping and handling. For even better protection, the finger 338 can terminate short of the end 15 of the pipe 14 with the notch 317 depth being increased as needed to provide sufficient space for the button 18 between the finger 338 and notch wall.

In use, the exhaust pipe sections are positioned with first pipe 14 overlapping second pipe 16 to form the illustrated lap joint. In this embodiment, finger 338 slides over and onto the outer surface of pipe 16 until it engages button 18. As finger 338 and button 18 meet from a generally straight-on or axial direction, the vertical flexibility of clip 322 allows finger 338 to slide over button 18 until button 18 fully enters the notch 317 and passes the end edge of finger 338, at which point it snaps down to retain the button 18 in place as a result of the intrinsic resiliency of the clip material. As shown in FIG. 9, the slanted surface of the finger 338 provides a bearing surface that allows it to ride up over the button 18 as the pipe sections are being assembled.

Figure 11:
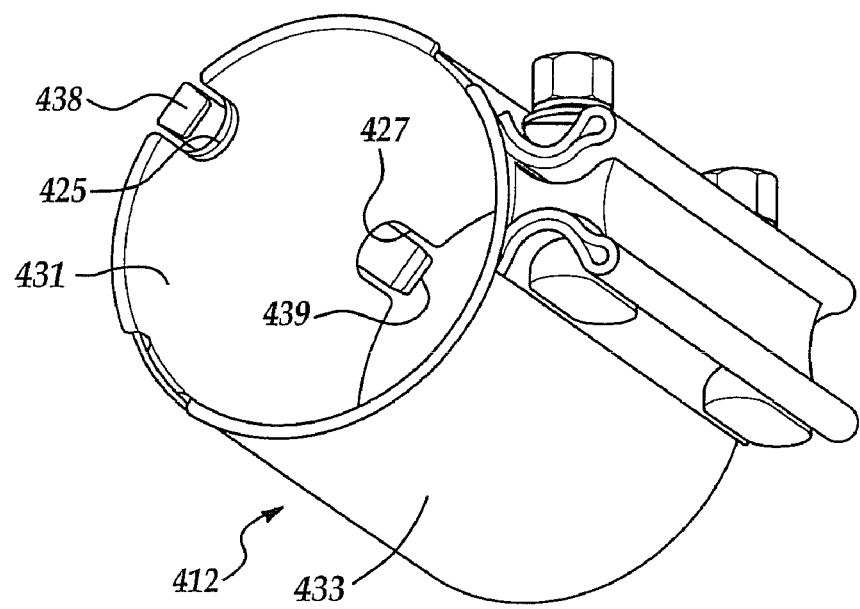
FIG. 11 is a perspective view of a fourth embodiment of the pipe clamp of the present invention showing notches formed in the edges of the clamp.
Figure 12:
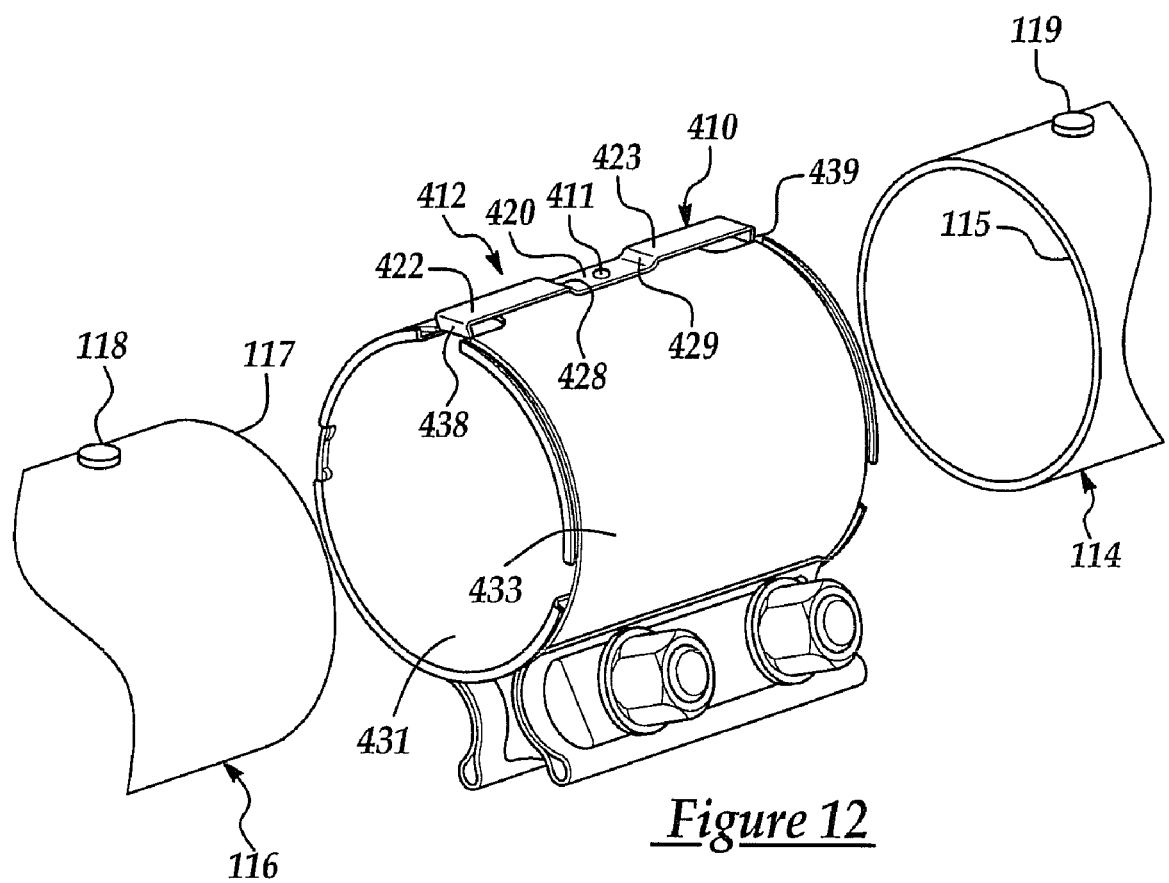
FIG. 12 is a perspective view showing the pipe clamp of FIG. 11 aligned to engage the exhaust pipes.

FIGS. 11 and 12 show a fourth embodiment of the present invention using a latch/clip arrangement that is similar to that of FIGS. 9 and 10, but is different primarily in that a pipe coupler 412 is used in combination with two substantially equal-diameter pipes 114, 116 that are brought together in coaxial alignment to form a butt joint. It also differs in that, like the band clamp 212 of FIGS. 7 and 8, the pipe coupler 412 is a separate component that is connected to each pipe 114, 116 via an interlocking feature or button 119, 118 located near the pipe ends 115, 117, respectively. Except as noted below, pipe coupler 412 can be made as shown and described in U.S. Patent Application Publication No. 2002/0014772 A1, published Feb. 7, 2002, the entire content of which is hereby incorporated by reference.

Pipe coupler 412 has a latch 410 that includes a base 420, a first clip 422, and a second clip 423. Clip 422 and clip 423 are set apart vertically from base 420 by a first step 428 and a second step 429, respectively. Clip 422 includes a first interlocking feature or retention finger 438 and clip 423 includes a second interlocking feature or retention finger 439. Clip 422 and finger 438 are structured and function similarly to clip 322 and finger 338 in the third embodiment and this description thus will not be repeated. Likewise, clip 423 and finger 439 are a mirror image of clip 422 and finger 438. Steps 428 and 429 facilitate vertical flexibility of clips 422 and 423 and also need not be necessary. Latch 410 is stamped from a unitary piece of sheet metal and is generally rectangular in cross-sectional shape. The latch can be welded to the band of the pipe coupler 412 at a welding area 411.

As is evident from FIG. 12, latch 410 has approximately the same length—from finger 438 to finger 439—as the axial length of the band. This is so the fingers 438, 439 will be flush with the lateral edges of the band to overlie a first notch 425 and a second notch 427, respectively, as best shown in FIG. 11. Notches 425 and 427 are each a U-shaped recess formed in both an inner sleeve 431 and outer band 433 of coupler 412. The notches 425, 427 are mirror images located on opposite sides or edges of the coupler 412 and are directly across from each other. The notches 425, 427 are sized to receive buttons 118 and 119 to axially and rotationally align and retain pipes 116 and 114. The two buttons 118, 119 are welded at an optimal distance from their respective pipe ends 117, 115 so that when the buttons 118, 119 fully enter the notches 425, 427, the two pipe ends 115, 117 abut each other, either in actual contact with each other or separated by a short distance. With the pipes 114, 116 aligned coaxially, coupler 412 can be slid over pipe 116 or pipe 114 separately, followed by the other, or both pipes 114, 116 can be simultaneously slid into the coupler 412. In any case, fingers 438 and 439 slide over and onto the surfaces of pipes 116 and 114 until engagement with the respective buttons 118, 119, at which point the fingers 438, 439 ride up over the buttons 118, 119 as the coupler 412 is further slid over the pipe end. Each finger 438, 439 includes a slanted end defining a bearing surface that engages the buttons 118, 119 to allow the finger 438, 439 to flex upwardly and ride over the button 118, 119, as described above in connection with the embodiment of FIGS. 9 and 10. The notches 425, 427 and end portions of each finger 438, 439 define a space between them that is sized to receive the buttons 118 and 119 so that, once the buttons 118, 119 pass by the end of their respective fingers 438, 439 and fully enter their respective notches 425, 427, the end of each finger 438, 439 snaps back down towards the surface of the pipe 114, 116, thereby capturing the button 118, 119 between the end of the finger 438, 439 and the U-shaped walls defining the notch 425, 427. The coupler 412 can then be tightened to completely seal the pipe ends 115, 117 together.

As will be appreciated, by simply pre-attaching or pre-forming buttons 118 and 119 on the pipes 116 and 114 at the proper axial and circumferential position, coupler 412 ensures a proper relative rotational alignment of the two pipes 114, 116 without any special keying together or other interconnection of the two pipe ends 115, 117, and the coupler 412 maintains this relative rotational position while the coupler 412 is loosely connected to the pipes 114, 116. Furthermore, it will be appreciated that in this embodiment, the two pipes 114, 116 are held in position relative to each other by the combination of the notches 425, 427 and fingers 438, 439 of the pipe coupler 412, with the notches 425, 427 being used to fix the relative rotational position of the two pipes 114, 116, and the fingers 438, 439 being used to fix and hold the relative axial position of the two pipes 114, 116.

Although a single latch 410 is shown in FIGS. 11 and 12 for the pipe coupler 412, it will be appreciated that separate latches (not shown) could be used in connection with each notch 425, 427. It will also be understood that the notches 425, 427 need not be circumferentially aligned. Other such variations will become apparent to those skilled in the art.

Figure 13:
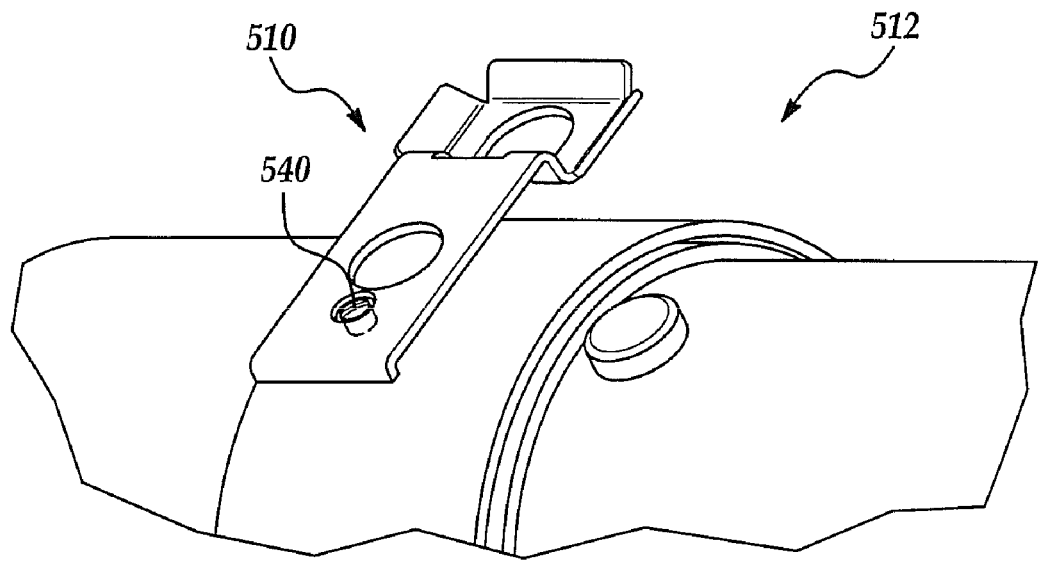
FIG. 13 is a partial perspective view of a fifth embodiment of the pipe clamp of the present invention showing a swivel latch.

FIG. 13 shows a fifth embodiment of a band clamp 512 of the present invention. This embodiment shows a swivel connection 540 that can be implemented in all the other embodiments in place of a rigid attachment of a latch 510 to the band clamp 512. Swivel connection 540 can be located at the respective welding areas and secures the latch 510 to the pipe clamp 512 so that there is no need to spot-weld the latch 510 at all. Swivel connection 540 does not affect the functioning of the latch 510 other than allowing the latch 510 to be rotated as shown in FIG. 13 to ease shipping and handling. The latch 510 can rotate back to its proper position during use. Thus, as shown, the latch 510 can rotate from a first position in which the length—longest dimensional distance—is not aligned with the axis of the band clamp 512, to a second position (shown in the other figures) in which the length is aligned with the axis of the band clamp 512.

It will thus be apparent that there has been provided in accordance with the present invention a pipe clamp and integral latch which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, the pipe clamp can be connected to the pipe by an attachment means other than spot-welding, as will be known to those skilled in the art, and other varieties of different tightening mechanisms for the pipe clamp can be used. Also, rather than welding or otherwise attaching the button onto the pipe, the button can be formed from the pipe itself by stamping or other deformation of the pipe wall. All such variations and modifications are intended to come within the scope of the appended claims.

As used in this specification and appended claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe clamp for securing two pipes together using a button located at an outer surface of at least one of the pipes, comprising:
    a metal band comprising a single piece of sheet metal having first and second ends and extending axially from a first lateral edge to a second lateral edge, said band having a notch in at least one of said lateral edges;
    a tightening mechanism connected to the ends of said band, said tightening mechanism including a fastener for drawing the ends of said band together such that said band can be tightened about a first pipe; and
    a latch attached to said band and having a finger extending over said notch, said finger having an end portion that, together with said notch, defines a space sized to receive the button.

2. A pipe clamp as defined in claim 1, wherein said pipe clamp comprises a pipe coupler.

3. A pipe clamp as defined in claim 1, further comprising a sleeve, wherein said band overlies said sleeve.

4. A pipe clamp as defined in claim 3, wherein said sleeve includes a notch that is coextensive with the notch in said band.

5. A pipe clamp as defined in claim 1, wherein said latch extends axially along said band between said lateral edges of said band.

6. A pipe clamp for securing two pipes together, comprising:
    a metal band comprising a single piece of sheet metal having first and second ends;
    a tightening mechanism connected to the ends of said band, said tightening mechanism including a fastener that draws the ends of said band together such that said band can be tightened about a first pipe; and
    a latch attached to said band and having a base portion at least partially overlapping said band, said latch further including a clip adapted to engage a button located at an outer surface of a second pipe when the first and second pipes are brought together in axial alignment, wherein said clip comprises a first clip and wherein said latch further comprises a second clip extending from said base portion in a direction opposite said first clip, said second clip adapted to engage a second button located at an outer surface of the first pipe;
    wherein said band comprises at least one notch and wherein at least one of said first and second clips at least partially overlies said notch such that, when the pipes are brought together into axial alignment with said first and second clips engaging their respective buttons, the first and second pipes are inhibited from axial movement away from said band by said clips, and at least one of the first and second pipes is inhibited from rotational movement relative to said band by said notch.

7. A pipe clamp as defined in claim 6, wherein each of said first and second clips is offset from said base portion by a step that extends generally perpendicular to said base portion and said clips.

8. A pipe clamp as defined in claim 6, wherein each of said first and second clips includes at least one slanted edge defining a bearing surface that enables said first and second clips to ride up on and snap over their respective buttons.

9. A pipe clamp as defined in claim 6, wherein said second clip has substantially the same conformation as said first clip.

10. A pipe clamp as defined in claim 6, wherein said latch is attached to said band at a location that is offset from said tightening mechanism.

11. A pipe clamp as defined in claim 6, further comprising a sleeve located radially within said band and having a notch that is coextensive with the notch in said band.

12. A pipe clamp for securing together two pipes that each have a button located at an outer surface of the pipe near one of its ends, said pipe clamp comprising:
  a metal band comprising a single piece of sheet metal having first and second ends and extending axially from a first lateral edge to a second lateral edge;
  a sleeve located radially within said band and extending from said first lateral edge to said second lateral edge, said band and said sleeve each being sized to fit over the ends of the two pipes to couple them together;
  said band and said sleeve each having a first notch at said first lateral edge and a second notch at said second lateral edge, wherein the first notch in said sleeve is aligned with the first notch in said band, and the second notch in said sleeve is aligned with the second notch in said band, said first notches each being sized to receive one of the buttons upon insertion of one of the pipe ends into the clamp, and the second notches each being sized to receive another one of the buttons upon insertion of the other pipe end into the clamp;
  a tightening mechanism connected to the ends of said band, said tightening mechanism including a fastener that draws the ends of said band together such that said band can be tightened about the pipes;
  a first clip located adjacent said first lateral edge and overlying said first notches in said band and sleeve at said first lateral edge, whereby said first clip is associated with said first notches; and
  a second clip located adjacent said second lateral edge and overlying said second notches in said band and sleeve at said second lateral edge, whereby said second clip is associated with said second notches;
  wherein each clip overlies its associated notches such that, when the pipes are brought together into axial alignment within said clamp and the buttons of the two pipes are inserted into the notches at the first and second lateral edges, each clip engages one of the buttons within its associated notches such that the pipes are inhibited from axial and rotational movement relative to said clamp.

13. A pipe clamp as defined in claim 12, wherein each clip comprises a finger extending over its associated notches, each said finger having an end portion that, together with its associated notches, defines a space sized to receive one of the buttons, wherein the pipes are inhibited from axial movement away from said clamp by said clips and are inhibited from rotational movement relative to said clamp by said notches.

14. A pipe clamp as defined in claim 12, wherein said first and second clips comprise portions of a unitary latch having a base portion attached to said band with said clips extending away from said base portion in opposite directions.

15. A pipe clamp as defined in claim 14, wherein said latch has a length that is about the same as the distance from said first lateral edge to said second lateral edge.

16. A pipe clamp as defined in claim 12, wherein each clip comprises a flexible finger having a slanted bearing surface positioned to ride up and over one of the buttons when the button is inserted into the notches underlying the finger.

* * * * *